(12) United States Patent
Froeschl et al.

(10) Patent No.: US 8,003,246 B2
(45) Date of Patent: Aug. 23, 2011

(54) ENERGY STORE WITH GUIDE ROD

(75) Inventors: Joachim Froeschl, Herrsching (DE); Markus Kaindl, Rohrbach (DE); Anton Schumann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 128 days.

(21) Appl. No.: 12/394,708

(22) Filed: Feb. 27, 2009

(65) Prior Publication Data

US 2010/0021809 A1 Jan. 28, 2010

Related U.S. Application Data

(63) Continuation of application No. PCT/EP2007/007407, filed on Aug. 23, 2007.

(30) Foreign Application Priority Data

Aug. 30, 2006 (DE) .......................... 10 2006 040 607

(51) Int. Cl.
*H01M 6/42* (2006.01)
(52) U.S. Cl. .......................... 429/160; 429/152; 429/178
(58) Field of Classification Search .................. 429/152, 429/160, 178; 340/636
See application file for complete search history.

(56) References Cited

U.S. PATENT DOCUMENTS

| | | | |
|---|---|---|---|
| 3,275,902 A | 9/1966 | McHugh et al. | |
| 4,734,341 A | 3/1988 | Descroix et al. | |
| 4,833,459 A * | 5/1989 | Geuer et al. | 340/636.12 |
| 5,047,301 A * | 9/1991 | Adlhart et al. | 429/101 |
| 6,139,987 A | 10/2000 | Koo et al. | |
| 2003/0171784 A1 | 9/2003 | Dodd et al. | |
| 2005/0064280 A1 * | 3/2005 | Watanabe et al. | 429/120 |
| 2005/0123828 A1 * | 6/2005 | Oogami et al. | 429/152 |
| 2006/0246350 A1 * | 11/2006 | Takayama et al. | 429/178 |

FOREIGN PATENT DOCUMENTS

| | | |
|---|---|---|
| DE | 35 20 885 C1 | 9/1986 |
| EP | 0 277 321 A | 8/1988 |
| FR | 2 773 268 A | 7/1999 |
| GB | 2 066 554 A | 7/1981 |
| GB | 2 171 552 A | 8/1986 |
| GB | 2 176 929 A | 1/1987 |
| WO | WO 91/17451 A1 | 11/1991 |

OTHER PUBLICATIONS

International Search Report dated Feb. 12, 2008 with English translation (six (6) pages).

* cited by examiner

*Primary Examiner* — Barbara L Gilliam
*Assistant Examiner* — Zachary Best
(74) *Attorney, Agent, or Firm* — Crowell & Moring LLP

(57) ABSTRACT

An energy storage device is provided including multiple back-to-back-disposed storage cells, from the first end of which the plus pole is made to emerge and from the other end of which the minus pole is made to emerge, thereby creating a series circuit of the storage cells. In order to reduce fabrication costs, it is proposed that each of the storage cells have a continuous opening between the plus pole and the minus pole, through which opening a guide rod extends that secures the back-to-back-disposed storage cells in this position.

20 Claims, 1 Drawing Sheet

ENERGY STORE WITH GUIDE ROD

CROSS REFERENCE TO RELATED APPLICATIONS

This application is a continuation of PCT International Application No. PCT/EP2007/007407, filed Aug. 23, 2007, which claims priority under 35 U.S.C. §119 to German Patent Application No. 10 2006 040 607.9, filed Aug. 30, 2006, the entire disclosures of which are herein expressly incorporated by reference.

BACKGROUND AND SUMMARY OF THE INVENTION

The invention relates to an energy storage device composed of multiple storage cells disposed back-to-back, from the first end of which the plus pole is made to emerge and from the other end of which the minus pole is made to emerge, thereby creating a series circuit of the storage cells.

Currently-found energy storage devices having storage cells in the form of double-layer capacitors are often welded together or retained within costly brackets or housings. This entails high fabrications costs, and there is no assurance of having a defined position for the storage cells.

The problem to be solved by this invention is to reduce the cost of fabricating an energy storage device from storage cells, such as, in particular, double-layer-capacitor cells.

This problem is solved by an energy storage device according to the present invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
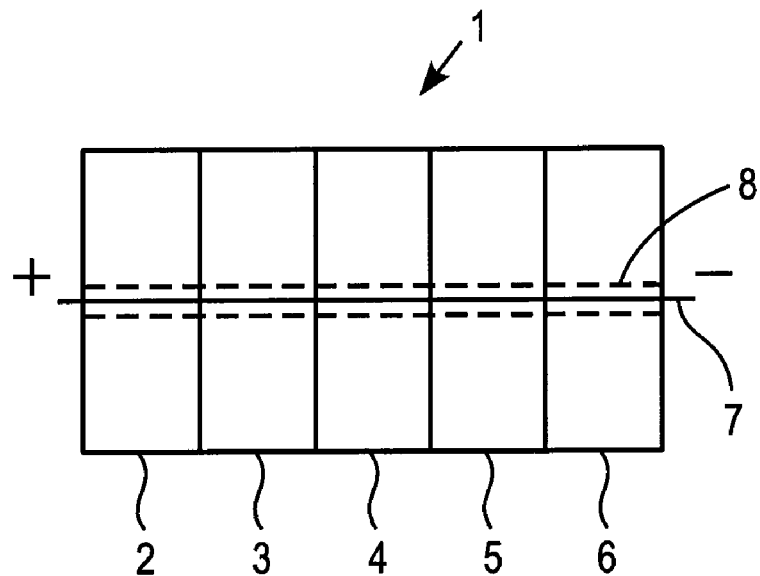
FIG. 1 is a schematic representation of an exemplary embodiment of an energy storage device in accordance with the present invention.
Figure 2:
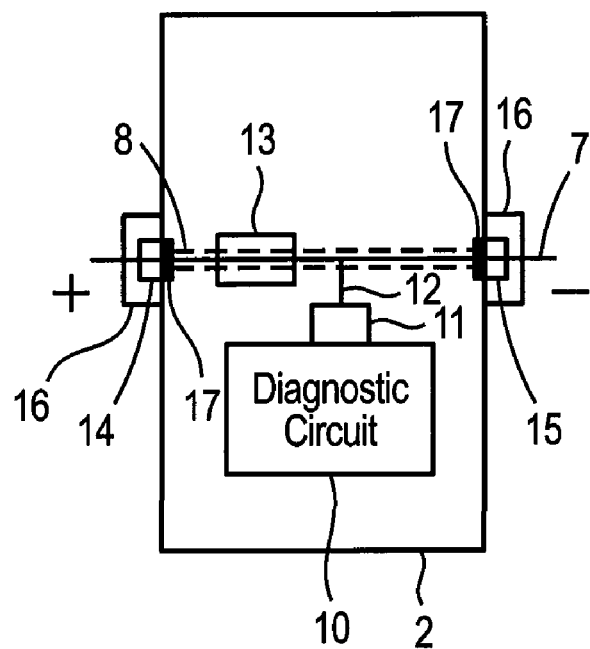
FIG. 2 is a schematic representation of an exemplary embodiment of a storage cell, in accordance with the present invention.

As illustrated in FIG. 1, an exemplary embodiment of an energy storage device 1 includes a plurality of back-to-back disposed storage cells 2, 3, 4, 5, 6. Each of the storage cells has a continuous opening 8 between the plus pole and the minus pole, through which a guide rod 7 extends. The guide rod 7 secures the storage cells together. FIG. 2 illustrates an exemplary embodiment of a storage cell 2, which includes a diagnostic circuit 10 which has at least one electrical conductor 11 that is electrically connected to the guide rod 7 by an electrical contact 12. The electrical contact 12 may be a spring-contact body, bonding wire, solder connection, welded connection, or the like.

An aspect of the invention is to design the storage cells such that they have a continuous opening between their plus pole and their minus pole. A guide rod extends through this opening, the rod securing the back-to-back-disposed storage cells in this position. As a result, a mechanically reliably secured series circuit of storage cells can be achieved simply and inexpensively. If the storage cells involve double-layer capacitors, what is especially advantageous is the fact that the missing volume from the continuous opening or "tunnel" hardly results in any reduction in the capacity of the double-layer capacitor. The continuous opening is preferably located at the center of the storage cell (as viewed relative to the cross-section of the storage cell). Only small areas of the double layer of the double-layer capacitor can be wrapped up in this region in any case.

In one embodiment of the invention, provision is made whereby each of the storage cells has a diagnostic circuit having at least one electrical terminal. The guide rod may be provided with at least one electrical conductor that is electrically connected to the electrical terminal and makes the electrical terminal of the diagnostic circuit electrically accessible from outside the energy storage device. As a result, the entire diagnostic electronics unit and its "wiring" are shielded in a technically elegant manner both mechanically as well as electrically from negative effects from outside.

In a first embodiment, the electrical contact is created between the terminal of the diagnostic circuit and the electrical conductor by a spring contact body. This allows the storage cells to be easily disposed on the guide rod and the electrical connections to be created. This solution also allows for simple disassembly of individual storage cells, in particular, in the event these are to be replaced during repair or the energy storage device is to be dismantled for subsequent recycling.

In a second embodiment, the electrical contact 12 is created between the terminal of the diagnostic circuit and the electrical conductor by a bonding wire. The electrical contact 12 between the terminal of the diagnostic circuit and the electrical conductor can also be created by a solder connection or a welded connection. These embodiments also enable very reliable contact bonds to be achieved, an aspect which is important specifically in the case of vehicles that are subject to significant vibration and shock.

In a further embodiment of the invention, provision is made whereby each of the storage cells is connected in a positive-locking manner to the guide rod in the position intended for it, such as by mechanical detent engagement or an individual-cell screw connection 13. In this way, the position of the storage cells is secured even in the case of significant shocks or vibrations when the vehicle is operated.

In a further embodiment of the invention, provision is made whereby the guide rod has multiple conductors and each of the electrical conductors is disposed on the guide rod in such a way that the conductor creates an electrical connection with a predetermined diagnostic circuit out of the plurality of diagnostic circuits. In another embodiment of the invention, provision is made whereby the guide rod is at least partially conductive and aside from its mechanical function constitutes at least one electrical bus line through which the terminals of the diagnostic circuit can be electrically contacted. These measures according to the invention provide reliable communications connections, which are also essentially shielded from negative effects from the environment, between the vehicle electronics and the diagnostic circuits at the storage cells.

In further embodiment of the invention, provision is made whereby the guide rod has one electrical bridging element per storage cell that with an appropriate contact connection can short-circuit a storage cell for the purpose of equilibrating or heating.

In one embodiment of the invention, provision is made whereby the guide rod has one thread 14, 15 each in front of the first storage cell and behind the last storage cell onto which at least one nut 16 each is screwed that secures the storage cells in their position relative to each other and to the guide rod. What is achieved thereby is an easy-to-implement yet reliable series connection of the storage cells to form an energy storage device.

In an exemplary embodiment of the invention, provision is made whereby each of the storage cells has a projecting seal 17 in the region of the plus pole and/or the minus pole, which seal surrounds the voltage pole and hermetically seals the contact region between the voltage poles of two storage cells located back-to-back on the guide rod. This enables corrosion and contamination to be effectively prevented in the region of the voltage poles, thereby enhancing the long-term reliability of the energy storage device.

In an exemplary embodiment of the invention, the storage cells are double-layer capacitors. The invention can similarly be used to create an energy storage device out of multiple series-connected lithium-ion cells or Ni-MH cells.

In one embodiment of the invention, provision is made whereby the storage cells are double-layer capacitors, through the metal layer of which a short-circuit is passed, either fully or partially, to heat the storage cells. The short-circuit current may be supplied and/or drained through the guide rod. In addition, the short-circuit current may be conducted into the storage cells whenever electrical current is generated when the vehicle is braking (regeneration). Particularly in the case of the energy storage device according to the invention, any excess of energy that can no longer be stored may then actually be available that can be utilized to heat the storage cells, and thus enhance their storage capacity, especially in the event of low outside temperatures.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An energy storage device, comprising:
   a plurality of back-to-back-disposed storage cells, from a first end of which a plus pole of the energy storage device emerges and from a second end of which a minus pole of the energy storage device emerges, thereby creating a series circuit of the storage cells, wherein
   each of the storage cells has a plus pole and a minus pole at opposite ends thereof,
   each storage cell includes a continuous opening that extends from the plus pole at one end of the storage cell to the minus pole at another end of the storage cell through a center of the storage cell, and
   the back-to-back-disposed storage cells are secured together by a guide rod that extends through the opening in each of storage cells.

2. The energy storage device according to claim 1, wherein each of the storage cells has a diagnostic circuit with at least one electrical terminal, and the guide rod is provided with an electrical conductor that is electrically connected to the electrical terminal and makes the electrical terminal of the diagnostic circuit electrically accessible from outside the energy storage device.

3. The energy storage device according to claim 2, wherein an electrical contact between the terminal of the diagnostic circuit and the electrical conductor is created by a spring-contact body.

4. The energy storage device according to claim 2, wherein an electrical contact between the terminal of the diagnostic circuit and the electrical conductor is created by a bonding wire.

5. The energy storage device according to claim 2, wherein an electrical contact between the terminal of the diagnostic circuit and the electrical conductor is created by a solder connection or by a welded connection.

6. The energy storage device according to claim 1, wherein each of the storage cells is connected to the guide rod in an intended position in a positive-locking manner by a mechanical detent engagement or individual-cell screw connection.

7. The energy storage device according to claim 2, wherein the guide rod has multiple connectors and each of the electrical conductors is disposed on the guide rod in such a way that the conductor creates an electrical connection with one diagnostic circuit out of the plurality of diagnostic circuits.

8. The energy storage device according to claim 1, wherein the guide rod is at least partially electrically conductive and aside from its mechanical function constitutes an electrical bus line through which the terminals of the diagnostic circuits are electrically contacted.

9. The energy storage device according to claim 1, wherein the guide rod has one thread each in front of a first storage cell and behind a last storage cell, onto which thread a nut is screwed that secures the storage cells in their positions relative to each other and relative to the guide rod.

10. The energy device according to claim 1, wherein each of the storage cells has a projecting seal in the region of the plus pole and/or minus pole, the seal surrounding the voltage pole and hermetically sealing the contact region between the voltage poles of two storage cells located back-to-back on the guide rod.

11. The energy storage device according to claim 1, wherein the storage cells are double-layer capacitors, lithium-ion cells, or Ni-MH cells.

12. The energy storage device according to claim 1, wherein the storage cells are double-layer capacitors, through a metal layer of which a short-circuit current is conducted, either fully or partially, to heat or equilibrate the storage cells, and which current is supplied and/or drained through the guide rod.

13. The energy storage device according to claim 2, wherein each of the storage cells is connected to the guide rod in an intended position in a positive-locking manner by a mechanical detent engagement or individual-cell screw connection.

14. The energy storage device according to claim 3, wherein the guide rod has multiple connectors and each of the electrical conductors is disposed on the guide rod in such a way that the conductor creates an electrical connection with one diagnostic circuit out of the plurality of diagnostic circuits.

15. The energy storage device according to claim 2, wherein the guide rod is at least partially electrically conductive and aside from its mechanical function constitutes an electrical bus line through which the terminals of the diagnostic circuits are electrically contacted.

16. The energy storage device according to claim 2, wherein the guide rod has one thread each in front of a first storage cell and behind a last storage cell, onto which thread a nut is screwed that secures the storage cells in their positions relative to each other and relative to the guide rod.

17. The energy device according to claim 2, wherein each of the storage cells has a projecting seal in the region of the plus pole and/or minus pole, the seal surrounding the voltage pole and hermetically sealing the contact region between the voltage poles of two storage cells located back-to-back on the guide rod.

18. The energy storage device according to claim 2, wherein the storage cells are double-layer capacitors, lithium-ion cells, or Ni-MH cells.

19. The energy storage device according to claim 2, wherein the storage cells are double-layer capacitors, through a metal layer of which a short-circuit current is conducted, either fully or partially, to heat or equilibrate the storage cells, and which current is supplied and/or drained through the guide rod.

20. The energy storage device according to claim 3, wherein each of the storage cells is connected to the guide rod in an intended position in a positive-locking manner by a mechanical detent engagement or individual-cell screw connection.

\* \* \* \* \*